(12) United States Patent
Urakami

(10) Patent No.: US 10,728,455 B2
(45) Date of Patent: Jul. 28, 2020

(54) IMAGING APPARATUS AND CONTROL METHOD THEREOF

(71) Applicant: CANON KABUSHIKI KAISHA, Tokyo (JP)

(72) Inventor: Toshifumi Urakami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/257,158

(22) Filed: Jan. 25, 2019

(65) Prior Publication Data
US 2019/0238753 A1 Aug. 1, 2019

(30) Foreign Application Priority Data

Jan. 30, 2018 (JP) ................... 2018-013252

(51) Int. Cl.
*H04N 5/232* (2006.01)
*H04N 5/235* (2006.01)
*H04N 5/225* (2006.01)

(52) U.S. Cl.
CPC ....... *H04N 5/23267* (2013.01); *H04N 5/2253* (2013.01); *H04N 5/2254* (2013.01); *H04N 5/2327* (2013.01); *H04N 5/2353* (2013.01); *H04N 5/232939* (2018.08)

(58) Field of Classification Search
CPC ............. H04N 5/23267; H04N 5/2253; H04N 5/2254; H04N 5/2353; H04N 5/232939; H04N 5/2327; H04N 5/23287; H04N 5/232122; H04N 5/23258

USPC ....................................... 348/208.6
See application file for complete search history.

(56) References Cited

U.S. PATENT DOCUMENTS

2006/0257127 A1* 11/2006 Patterson ............ F24D 19/1051
392/441
2007/0047936 A1* 3/2007 Hirota ................ H04N 5/23248
396/55

FOREIGN PATENT DOCUMENTS

JP 2011-081417 A 4/2011

\* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An imaging apparatus including an imaging element that images an object through an imaging optical system is provided that includes a driving unit configured to drive the imaging element in a direction orthogonal to the optical axis of the imaging optical system; a correction unit configured to correct image blur of an image captured by the imaging element by calculating a moving amount of the imaging element based on a shake detection signal from a shake detection unit and controlling the drive unit; and a control unit configured to perform control to change an opening amount of a field frame of a viewfinder used in observation the object. The control unit performs to reduce the field frame in a case where the image shake correction is performed so as to be smaller than the field frame in a case where the image shake correction is not performed.

17 Claims, 11 Drawing Sheets

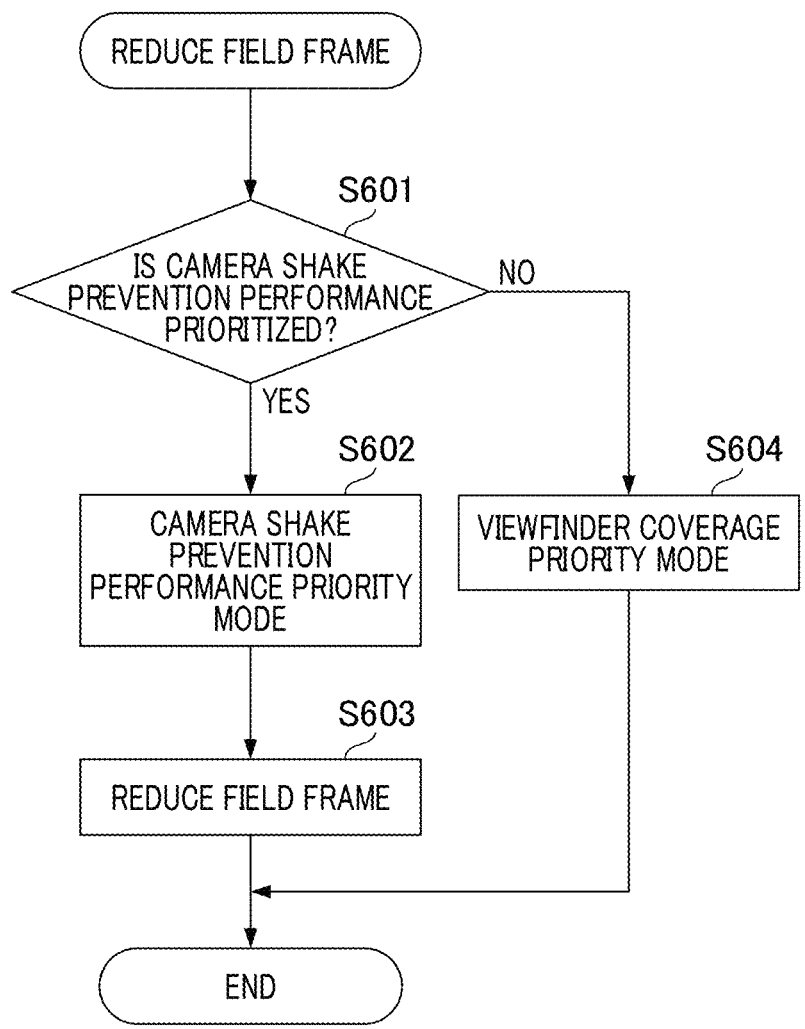

IMAGING APPARATUS AND CONTROL METHOD THEREOF

BACKGROUND OF THE INVENTION

Field of the Invention

The present invention relates to an imaging apparatus including an image shake correction mechanism unit and a viewfinder, and a control method thereof.

Description of the Related Art

In order to reduce image shake caused by, for example, camera shake by a photographer, there is an imaging apparatus having an image shake correction mechanism unit. The image shake correction mechanism unit performs image shake correction by moving, for example, an imaging element. An apparatus disclosed in Japanese Patent Application Laid-Open No. 2011-81417 includes a fixed support plate fixed to a camera body and a movable plate that is freely movable with respect to the fixed support plate. The movable plate that holds the imaging element can move in a direction orthogonal to the optical axis of the camera and in a rotational direction around the optical axis. A magnetic force generating device integrated with the fixed support plate and a drive coil located at the movable plate side and that generates a driving force by receiving a magnetic force generated at the magnetic force generating device are provided. Image shake correction is performed by energizing the drive coil in response to the camera shake detected by using, for example, an angular velocity sensor and an acceleration sensor, and moving the imaging element held by the movable plate.

The conventional image shake correction mechanism unit moves the imaging element in response to camera shake and the like. In contrast, an observation range of a viewfinder, in particular, an optical viewfinder, used by a user for observing an object, is a range fixed in a camera main body. Hence, a gap may occur between the observation range through the viewfinder and an imaging range captured by the imaging element depending on a state of camera shake and timing of shooting. If the observation range through the viewfinder cannot be included in the imaging range, an object that can be observed through the optical viewfinder is not shot, thereby the object is not seen in the shot image. In particular, in a viewfinder having a viewfinder coverage of 100% at which the observation range by the viewfinder substantially coincides with the imaging range, there is a more concern that a part of the observation image is not be captured.

SUMMARY OF THE INVENTION

The present invention provides an imaging apparatus that suppresses a situation in which an object that can be observed through a viewfinder is not shot even if the imaging element moves due to image shake correction.

An apparatus according to an embodiment of the present invention comprises an imaging element that images an object through an imaging optical system; a driving unit configured to drive the imaging element in a direction orthogonal to the optical axis of the imaging optical system; a correction unit configured to correct image blur of an image captured by the imaging element by calculating a moving amount of the imaging element based on a shake detection signal from a shake detection unit and controlling the drive unit; and a control unit configured to perform control to change an opening amount of a field frame of a viewfinder used in observation the object, wherein the control unit performs control to reduce the field frame in a case where the image shake correction is performed so as to be smaller than the field frame in a case where the image shake correction is not performed.

According to the present invention, it is possible to provide an imaging apparatus that suppresses a situation in which an object that can be observed by a viewfinder is not shot even if the imaging element moves due to image shake correction.

Further features of the present description will be apparent from the following description of the example (with reference to the attached drawings).

BRIEF DESCRIPTION OF THE DRAWINGS

FIG. 11 is a flowchart of the reduction process of the field frame according to the third embodiment.

DESCRIPTION OF THE EMBODIMENTS

Hereinafter, preferred embodiments of the present invention will be described in detail with reference to the accompanying drawings. In each embodiment, a description will be given of an example of a camera system in which a lens device can be mounted on the main body of an imaging apparatus.

First Embodiment

Figure 1:
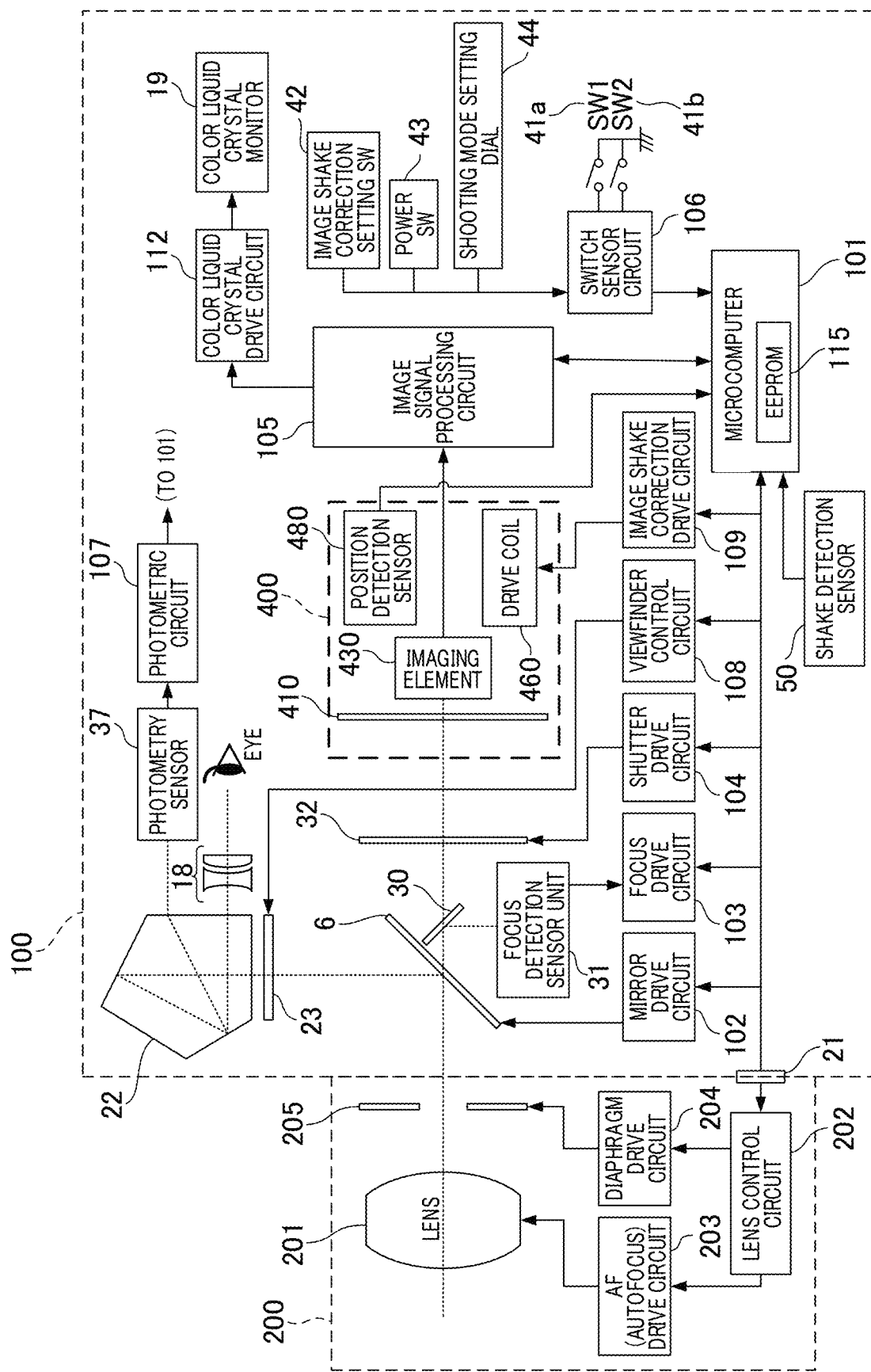
FIG. 1 is a block diagram illustrating a functional configuration of an imaging apparatus according to the embodiments of the present invention.

FIG. 1 is a block diagram that illustrates a functional configuration of a digital camera 100 according to the present embodiment. A microcomputer (hereinafter, referred to as "MPU") 101 is a control unit that integrates the operation control of each component included in the camera system. The MPU 101 controls a mirror drive circuit 102, a focus drive circuit 103, a shutter drive circuit 104, an image signal processing circuit 105, a switch sensor circuit 106, a photometric circuit 107, a viewfinder control circuit 108, and an image shake correction drive circuit 109. The MPU 101 holds data in an EEPROM (Electrically Erasable Programmable Read-Only Memory) 115.

The MPU 101 communicates with a lens control circuit 202 in an interchangeable lens unit 200 via a mount contact 21. In a state in which the interchangeable lens unit 200 is mounted on the main body of the imaging apparatus, the MPU 101 receives a signal via the mount contact 21 to determine that it can communicate with the lens control circuit 202. The lens control circuit 202 receives a control signal from the MPU 101 and controls the drive of a lens 201 and a diaphragm 205 of an imaging optical system via an AF (autofocus) drive circuit 203 and a diaphragm drive circuit 204. Note that in FIG. 1, although only one lens is shown for convenience of explanation, the lens unit 200 is actually configured by many lens groups including a focus lens.

The AF drive circuit 203 includes, for example, a USM (ultrasonic motor), and performs focus adjustment by moving a focus lens configuring the imaging optical system in accordance with the control signal from the lens control circuit 202. For an aperture mechanism unit, for example, an auto iris, the diaphragm drive circuit 204 controls a diaphragm amount of the diaphragm 205 in accordance with the control signal from the lens control circuit 202.

The main mirror 6 in the main body, which is held at an angle of 45 degrees to the optical axis of the imaging optical system, guides a light passing through the interchangeable lens unit 200 to a pentaprism 22 and transmits a part of the light to guide the light to a sub mirror 30. The sub mirror 30 is an optical member that guides the light transmitted through the main mirror 6 to a focus detection sensor unit 31.

The mirror drive circuit 102 is configured by, for example, a DC (direct current) motor and a gear train and moves the main mirror 6 to a mirror down position and a mirror up position. The mirror down position is a position at which the object can be observed through a viewfinder and the mirror up position is a position at which the main mirror 6 is retracted from the optical axis of the imaging optical system. Accompanying the drive of the main mirror 6, the sub mirror 30 moves to a position guiding the light to the focus detection sensor unit 31 and a position retracted from the optical axis of the imaging optical system.

The focus detection sensor unit 31 has a phase difference focus detection sensor. A detection signal in a focus state from the focus detection sensor unit 31 is output to the focus drive circuit 103, converted into an object image signal, and then transmitted to the MPU 101. The MPU 101 performs focus detection calculation by using the phase difference detection method based on the object image signal. Specifically, the MPU 101 calculates a defocus amount and a direction by using the object image signal and transmits the control signal to the lens control circuit 202. The lens control circuit 202 performs control to move the focus lens to an in-focus position via the AF drive circuit 203 in accordance with the calculated defocus amount and direction.

The pentaprism 22 converts the light reflected by the main mirror 6 into a light of an erect non-reverse image. Accordingly, a user can observe the object through a viewfinder eyepiece 18 via the viewfinder optical system. Additionally, the pentaprism 22 guides a part of the reflected light to a photometry sensor 37. The photometry sensor 37 is an imaging device using, for example, a CCD (Charge Coupled Device) and outputs a photometric value and RGB color information. The photometric circuit 107 converts the photometric value output from the photometric sensor 37 into a luminance signal for each area on an observation plane and outputs the signal to the MPU 101. The MPU 101 calculates an exposure value based on the luminance signal.

An in-viewfinder information display device 23 is a display device configured by, for example, a transparent organic EL (Electro Luminescence) panel. Based on the control signal from the viewfinder control circuit 108, the in-viewfinder information display device 23 displays a viewfinder observation range (a range within the field frame wherein a user determines an observable range of an object image), and displays the field frame in a manner in which the viewfinder observation range is superimposed on the object image. Note that, in addition to the transparent organic EL panel, a transparent liquid crystal panel such as a transparent inorganic EL panel and a PN (Polymer Network) liquid crystal may be used. An in-viewfinder display unit is configured by the in-viewfinder information display device 23 and the viewfinder control circuit 108.

A shutter unit 32 has a focal plane shutter and is controlled by the shutter drive circuit 104 that has received a control command from the MPU 101 to perform travel control of a front curtain and a rear curtain, which are light shielding members. When the user observes the object with the viewfinder eyepiece 18, the shutter front curtain is located at the light shielding position and the shutter rear curtain is located at the exposure position. Additionally, during shooting, an imaging light flux passes by exposure travel, in which the shutter front curtain moves from the light shielding position, to the exposure position, and an imaging element 430 photoelectrically converts the formed object image and outputs an imaging signal. Image data for one image is completed by shielding travel by which the shutter rear curtain moves from the exposure position to the light shielding position after the set exposure time (shutter speed) has elapsed. In the present embodiment, the shutter drive also corresponds to electronic front curtain travelling control. The electronic front curtain traveling is to perform reset scanning of the imaging element 430 (charge accumulation start scanning of pixels). Before shooting exposure, the travel of the mechanical shutter front curtain is completed in advance and the exposure operation is performed by slit travel between the electronic front curtain and the mechanical shutter rear curtain.

An imaging unit 400 includes an optical low pass filter 410 and an imaging element 430. The imaging element 430 is an imaging device using, for example, a CMOS (Complementary Metal Oxide Semiconductor) and a CCD, and photoelectrically converts the optical image of the object that has been formed and outputs an analog image signal. Additionally, the imaging unit 400 includes an image shake correction mechanism unit. Based on a detection signal such as camera shake, the image shake correction drive circuit 109 controls energization of a drive coil 460 to move the imaging element 430, thereby an image shake correction operation is performed.

The image signal processing circuit 105 performs an A/D (analog/digital) conversion process on the analog image signal that has been output from the imaging element 430 and further executes an image process such as a noise removal process and a gain adjustment process on the obtained digital image data. A color liquid crystal drive circuit 112 displays an image on the screen of a color liquid crystal monitor 19 in accordance with the image data output from the image signal processing circuit 105.

The switch sensor circuit 106 detects a switch (SW) signal of an operation member and outputs the signal to the MPU 101. A release SW 41 (41a, 41b), an image shake correction setting SW 42, a power SW 43, and a shooting mode setting dial 44 are shown in FIG. 1. The release SW 41 is a start switch used by a user for providing an instruction to start shooting, having a switch structure that is operated in stages. The first switch SW 1 (41a in FIG. 1) is turned on in the first stroke and the second switch SW 2 (41b in FIG. 1) is turned on in the second stroke. The image shake correction setting SW 42 is a setting switch for performing image shake correction. The power SW 43 is a switch for turning on/off operation of the power supply of the imaging apparatus. The shooting mode setting dial 44 is a rotating operation member used for setting the shooting mode.

A shake detection sensor 50 detects the shaking of the imaging apparatus due to, for example, the camera shake of the user and the swing of the body. As the shake detection sensor 50, an angular velocity sensor or an acceleration sensor such as a gyro sensor is used. For example, the shake detection sensor 50 detects each angular velocity in the lateral direction orthogonal to the imaging optical axis (referred to as the "X direction"), the vertical direction orthogonal to the imaging optical axis (referred to as "Y direction"), and the rotation direction around the imaging optical axis (roll direction). The shake detection signal from the shake detection sensor 50 is output to the MPU 101. A position detection sensor 480 in the imaging unit 400 has a Hall element and the like, and configures a position detection unit that detects the position of the imaging element 430. The position detection sensor 480 detects a displacement in the X direction, a displacement in the Y direction, and a rotational displacement in the direction around the optical axis, and outputs a position detection signal to the MPU 101.

Figure 2:
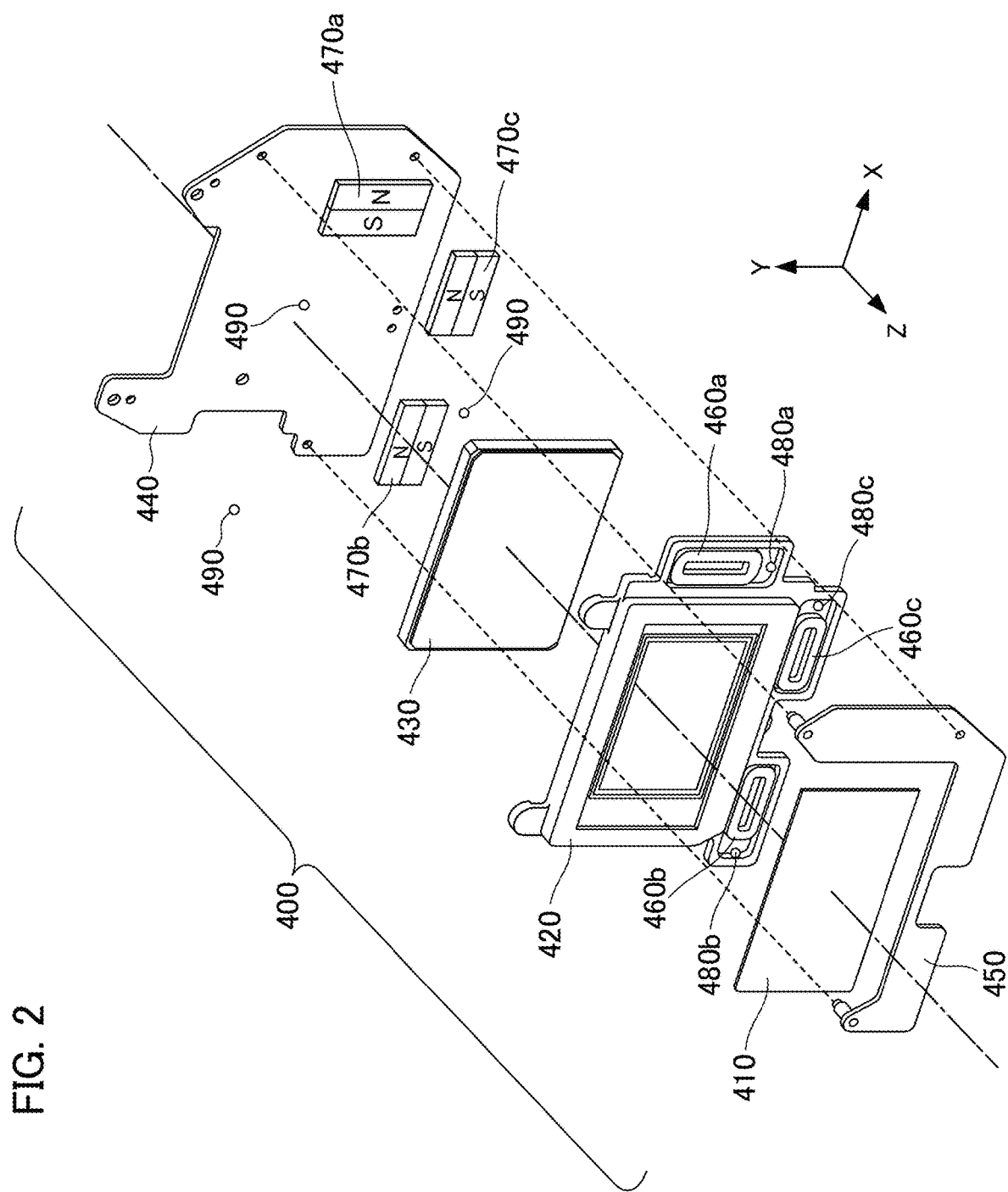
FIG. 2 is an exploded perspective view of an imaging unit according to the embodiments of the present invention.

With reference to FIG. 2, a configuration of the imaging unit 400 will be described. FIG. 2 is an exploded perspective view of the imaging unit 400. The imaging optical axis is defined as the Z axis, the lateral axis perpendicular to the Z axis is defined as the X axis, and the vertical axis orthogonal to the Z axis and the X axis is defined as the Y axis. Additionally, the positional relation between each of the parts will be described by the object side serving as the front side. The imaging unit 400 can move the imaging element 430 in each direction in order to suppress the image shake in the X direction, the Y direction, and the direction around the optical axis (roll direction). The optical low pass filter 410 is formed so as to be rectangular by using a single birefringent plate made of quartz crystal and is located in front of the imaging element 430. An optical coating process for infrared cutting, reflection prevention, and the like is performed on the surface of the optical low pass filter 410.

A shift holder 420 is a movable member that holds the optical low pass filter 410 and the imaging element 430, and is movable in the X direction, the Y direction, and the roll direction. The imaging element 430 is fixed to the shift holder 420 by a fastening member (not illustrated) or fixed by adhesion. A shift base 440 forms a part of the base member of the imaging unit 400 and is located on the back of the imaging element 430. A front base 450 is a substantially L-shaped member as viewed from the front, and is located on the side (front side) opposite to the shift base 440 across the shift holder 420. The shift base 440 and the front base 450 are formed of a soft magnetic material such as iron. A part of the front base 450 is coupled to the shift base 440 and integrated with the shift base 440. Specifically, the shift base 440 and the front base 450 configure the base member (fixed member) of the imaging unit 400 and support the movable member. The shift base 440 is fastened and fixed to the main body of the digital camera 100.

An X direction drive coil 460a and Y direction drive coils 460b and 460c are soldered to a flexible substrate (not illustrated) and adhered and fixed to the shift holder 420. The X direction drive coil 460a is located on the right side of the imaging element 430 as viewed from the front so that the coil center coincides with a predetermined position on a plane parallel to the XZ plane. Additionally, the Y direction drive coils 460b and 460c are symmetrical with respect to the YZ plane on the lower side of the imaging element 430, and are arranged at predetermined intervals in the X direction. The X direction drive coil 460a and the Y direction drive coils 460b and 460c configure an electromagnetic driving unit of the imaging unit 400, together with an X direction permanent magnet 470a and Y direction permanent magnets 470b and 470c.

The X direction permanent magnet 470a and the Y direction permanent magnets 470b and 470c are adhered and fixed on the surface of the shift base 440 facing the front base 450. In the X direction permanent magnet 470a, the N pole and the S pole thereof are aligned in the X direction, and in the Y direction permanent magnets 470b and 470c, the N pole and the S pole thereof are aligned in the Y direction. The permanent magnets 470a, 470b, and 470c are arranged to respectively face the drive coils 460a, 460b, and 460c. Specifically, the X direction drive coil 460a is always located within the magnetic field of the X direction permanent magnet 470a. The right portion of the drive coil 460a always overlaps with the N pole of the permanent magnet 470a in the Z direction as viewed from the front, and its left portion always overlaps with the S pole of the permanent magnet 470a in the Z direction. In contrast, the Y direction drive coil 460b is always located within the magnetic field of the Y direction permanent magnet 470b. The upper portion of the drive coil 460b always overlaps with the N pole of the permanent magnet 470b in the Z direction as viewed from the front and the lower portion of the drive coil 460b always overlaps with the S pole of the permanent magnet 470b in the Z direction. The Y direction drive coil 460c is always located within the magnetic field of the Y direction permanent magnet 470c. As viewed from the front, the upper portion of the drive coil 460c always overlaps with the N pole of the permanent magnet 470c in the Z direction and the lower portion of the drive coil 460c always overlaps with the S pole of the permanent magnet 470c in the Z direction.

If the energization to the X direction drive coil 460a is performed by the image shake correction drive circuit 109, the magnetic flux generated by the drive coil 460a magnetically interferes with the magnetic flux generated by the X direction permanent magnet 470a to generate a Lorentz force. The shift holder 420 attempts to linearly move in the X direction to the shift base 440 by using the Lorentz force generated by the electromagnetic drive unit as thrust (driving force). Specifically, if a current flows in the X direction drive coil 460a in the clockwise direction as viewed from the front, a force in the −X direction (left direction as viewed from the front) is generated in both the right portion and the left portion of the drive coil 460a. In contrast, if a current flows in the X direction drive coil 460a in the counterclockwise direction as viewed from the front, a force in the +X direction (right direction as viewed from the front) is generated in both the right portion and the left portion of the drive coil 460a. That is, the shift holder 420 can be linearly moved in the X direction (right and left directions as viewed from the front) by adjusting the orientation of the current of the X direction drive coil 460a by the image shake correction drive circuit 109. The Lorentz force is substantially proportional to the magnitude of the coil current, so if the current of the X direction drive coil 460a is increased, the thrust in the X direction increases. Therefore, it is possible to move the shift holder 420 in the X direction at a speed corresponding to a shake speed such as camera shake in the X direction by adjusting the magnitude of the current of the X direction drive coil 460*a* by the image shake correction drive circuit 109.

In contrast, if the energization to the Y-direction drive coils 460*b* and 460*c* is performed by the image shake correction drive circuit 109, the magnetic flux generated from the drive coils 460*b* and 460*c* and the magnetic flux generated from the Y-direction permanent magnets 470*b* and 470*c* magnetically interfere to generate a Lorentz force. The shift holder 420 attempts to linearly move in the Y direction toward the shift base 440 by using the Lorentz force generated by the electromagnetic driving unit as a thrust (driving force). Specifically, if a current flows in the Y direction drive coils 460*b* and 460*c* in the clockwise direction as viewed from the front, a force in the −Y direction (downward as viewed from the front) is generated in both the upper portion and the lower portion of the drive coils 460*b* and 460*c*. In contrast, if a current flows in the Y direction drive coils 460*b* and 460*c* in the counterclockwise direction as viewed from the front, a force in the +Y direction (upward as viewed from the front) is generated in both the upper portion and the lower portion of the drive coils 460*b* and 460*c*. Specifically, it is possible to linearly move the shift holder 420 in the Y direction (vertical direction as viewed from the front) by adjusting the orientation of the current by making the magnitudes of the currents of the Y direction drive coils 460*b* and 460*c* the same. The Lorentz force is substantially proportional to the magnitude of the coil current, so the increase of the currents of the Y direction drive coils 460*b* and 460*c* leads the thrust in the Y direction to increase. Therefore, it is possible to move the shift holder 420 in the Y direction at a speed corresponding to a shake speed due to camera shake in the Y direction by adjusting the magnitude of the current of the Y direction drive coils 460*b* and 460*c* by the image shake correction drive circuit 109. Furthermore, it is possible to set the thrusts in the Y direction generated in the drive coils 460*b* and 460*c* to different values by individually adjusting the magnitudes of the currents in the Y direction drive coils 460*b* and 460*c*. As a result, the shift holder 420 can be rotated relative to the shift base 440.

The position detection sensor 480*a* is located in the vicinity of the X direction drive coil 460*a* and is a Hall element that detects the displacement in the X direction of the movable member including the shift holder 420. The position detection sensor 480*a* is located at a position facing the magnetization boundary of the X direction permanent magnet 470*a*, is soldered to, for example, a flexible substrate (not illustrated), and is adhered and fixed to the shift holder 420. The position detection sensor 480*a* outputs an electric signal corresponding to a change in magnetic flux generated from the X direction permanent magnet 470*a*.

The positions detection sensors 480*b* and 480*c* are respectively located in the vicinity of the Y direction drive coils 460*b* and 460*c*, and the detection sensors 480*b* and 480*c* are Hall elements that detect the displacement in the Y direction of the movable member including the shift holder 420. The positions detection sensors 480*b* and 480*c* are respectively located at a position facing the magnetization boundary of the Y direction permanent magnets 470*b* and 470*c*, soldered to, for example, a flexible substrate (not illustrated), and adhered and fixed to the shift holder 420. The position detection sensors 480*b* and 480*c* respectively output an electric signal corresponding to a change in magnetic flux generated from the Y direction permanent magnets 470*b* and 470*c*. Note that, viewed from the front as shown in FIG. 2, the position detection sensor 480*b* is located at the left side of the Y direction drive coil 460*b* and the position detection sensor 480*c* is located at the right side of the Y direction drive coil 460*c*. Hence, the distance between the position detection sensors 480*b* and 480*c* can be longer than the case in which the position detection sensors 480*b* and 480*c* are located between the Y direction drive coils 460*b* and 460*c*. Accordingly, if the shift holder 420 rotates, the difference in detection values between the position detection sensors 480*b* and 480*c* increases and the rotation amount can be detected more accurately so that the image shake correction in the rotation direction against the camera shake and the like can be corrected more accurately.

A plurality of balls 490 are rolling members held between the shift holder 420 and the shift base 440, and in the example of FIG. 2, three balls are used. Each ball 490 is in contact with a holding portion (not illustrated) formed on each of the shift holder 420 and the shift base 440, and can roll with respect to the shift base 440 accompanying the motion of the shift holder 420. A contact surface portion where this holding portion is in contact with the ball 490 is formed of a flat surface portion parallel to a moving surface of the shift holder 420. This allows the balls 490 to roll in all directions parallel to the moving plane of the shift holder 420 (X direction and Y direction, including rotation direction around the optical axis). Since each ball 490 has same outer diameter, the shift holder 420 can be held and moved without tilt with respect to the optical axis. Additionally, the shift holder 420 is biased toward the shift base 440 by a magnetic attracting member or an elastic member. Thereby, each ball 490 can be held between the shift holder 420 and the shift base 440 in a pressurized state.

Each ball 490 is made of, for example, stainless steel (SUS 304) or a ceramic material so as not to be attracted by the permanent magnets 470*a*, 470*b*, and 470*c* arranged near the balls 490. Lubricant oil having an appropriate viscosity is applied between each ball 490 and the holding portion. The reason for this is to prevent the ball 490 from dropping out from the holding portion even if a holding force between the shift holder 420 and the shift base 440 decreases or disappears. Thereby, even if a large inertial force acts on the shift holder 420 due to the vibration or impact applied to the imaging unit 400, the ball 490 can be prevented from dropping out or shifting. Note that the driving method for moving the imaging element 430 in the X direction, the Y direction, and the roll direction is not limited to the above-described driving method by using the electromagnetic driving unit (the driving method using the coil and the magnet). For example, the method may be a driving method that uses a driving unit in which a direct-acting USM is used as a driving source.

Next, the image shake correction operation of the imaging unit 400 will be described. If shaking is applied to the digital camera 100 due to camera shake of the user and the like, angular shake and rotational shake with respect to the optical axis of the imaging optical system occur. In view of this, the image shake correction operation is performed by moving the imaging element 430 in a direction opposite to the image shake direction so as to cancel image shake.

In the digital camera 100, an image shake correction mode is set by setting the image shake correction to ON by the image shake correction setting SW 42. If shaking occurs in the X direction, the Y direction, and the roll direction in the digital camera 100, the shake detection sensor 50 detects shaking in each direction. The output of the shake detection sensor 50 is integrated and the angular shake amount in each direction is calculated and transmitted to the MPU 101.

Based on the angular shake amount transmitted from the shake detection sensor 50, the MPU 101 calculates a target value of the motion control of the imaging element 430 necessary to suppress the image shake. This target value corresponds to a target position in the X direction, the Y direction, and the roll direction. The MPU 101 outputs a control signal for moving the imaging element 430 to a position corresponding to the calculated target value to the image shake correction drive circuit 109. In accordance with the control signal from the MPU 101, the image shake correction drive circuit 109 controls energization to the X direction drive coil 460a and the Y direction drive coils 460b and 460c and moves the imaging element 430 to the target position.

The position detection sensor 480 detects the position of the movable member including the imaging element 430. That is, detection signals of the X direction displacement, the Y direction displacement, and the roll direction rotation displacement of the imaging element 430 are transmitted to the MPU 101. The MPU 101 compares the position corresponding to each target value in the X direction, the Y direction, and the roll direction to the detection position of the imaging element 430 obtained by the position detection sensor 480. The MPU 101 outputs a control signal to the image shake correction drive circuit 109 so that the difference between the target position and the detected position approaches zero. Through this feedback control, the imaging element 430 moves toward the target position and image shake is suppressed. A well-known technique may be used for correcting image shake in the rotation direction (roll direction). A first angular shake amount is calculated by a process that adds the angular shake amount in the Y direction and the angular shake amount in the roll direction. Additionally, a second angular shake amount is calculated by a process that subtracts the angular shake amount in the roll direction from the angular shake amount in the Y direction. With regard to the first angular shake amount, the feedback control of the drive coil 460b is performed so that the difference between the angular shake amount and the position detection sensor 480b becomes zero. With regard to the second angular shake amount, the feedback control of the drive coil 460c is performed so that the difference between the angular shake amount and the position detection sensor 480c becomes zero.

Figure 3:
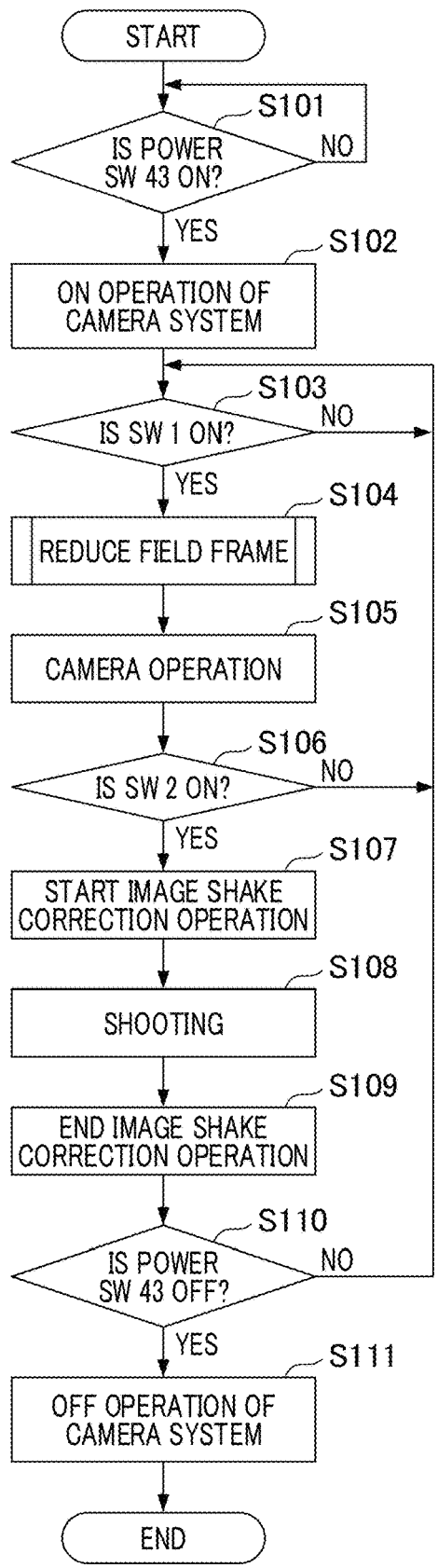
FIG. 3 is a flowchart illustrating an operation of the imaging apparatus according to the first embodiment.

With reference to the flowchart in FIG. 3, the operation of the imaging apparatus in the case where the image shake correction is set to ON will be described. In step S101, the MPU 101 determines whether or not the ON operation of the power SW 43 has been performed. The determination process in step S101 is repeated until the ON operation of the power supply SW 43 is performed, the user performs the ON operation of the power supply SW 43, and if the power source is turned on, the process proceeds to the process in step S102.

In step S102, the MPU 101 executes a process for activating the camera system (system ON operation). Electric power is supplied to each circuit and a system operation for enabling an initial setting of the system and a shooting operation is performed. In step S103, the MPU 101 determines whether or not the first switch SW 1 of the release switch 41 becomes ON. The determination process of step S103 is repeated until the ON operation of the SW 1 is performed, and if the ON operation of the SW 1 is performed as an instruction from the user, the process proceeds to step S104.

In step S104, a reduction process of the field frame is performed. Based on the control signal from the viewfinder control circuit 108, the in-viewfinder information display device 23 displays a field frame that determines a range of the object image that can be observed by the user in accordance with the state of the imaging apparatus. Details of the reduction process of the field frame will be described below.

In step S105, the MPU 101 controls the camera operation. This camera operation is a well-known technique including an operation that moves the focus lens to the in-focus position based on the focus detection result and an operation that calculates an exposure value by performing the photometric calculation, so a detailed description thereof will be omitted. In step S106, the MPU 101 determines whether or not the second switch SW 2 of the release SW 41 becomes ON. If the ON operation of the SW 2 is performed as an instruction from the user, the process proceeds to step S107. Additionally, if OFF of the SW 2, in which the ON operation of the SW 2 is not performed, is detected, the process returns to step S103.

In step S107, the image shake correction operation starts. Specifically, in accordance with the control signal of the MPU 101, the image shake correction drive circuit 109 controls the energization of the X direction drive coil 460a and the Y direction drive coils 460b and 460c. The image shake correction operation is performed by moving the imaging element 430 in a direction opposite to the image shake direction due to, for example, camera shake. Next, in step S108, the MPU 101 controls the shutter unit 32 and the diaphragm 205 based on the calculated exposure value, and performs exposure control of the imaging element 430. If the exposure of the imaging element 430 ends, the image shake correction operation ends in step S109. Accordingly, a series of shooting operations is completed.

In step S110, the MPU 101 determines whether or not the OFF operation of the power supply SW 43 has been performed in a standby state of the imaging apparatus. If the OFF operation of the power SW 43 has been performed, the process proceeds to step S111. If the OFF operation of the power SW 43 has not been performed, the process returns to the process of step S103. In step S111, the MPU 101 performs control for ending the operation of each circuit of the imaging apparatus, stores necessary information and the like in the EEPROM 115, and cuts off the power supply to each circuit (system OFF operation).

Figure 4A:
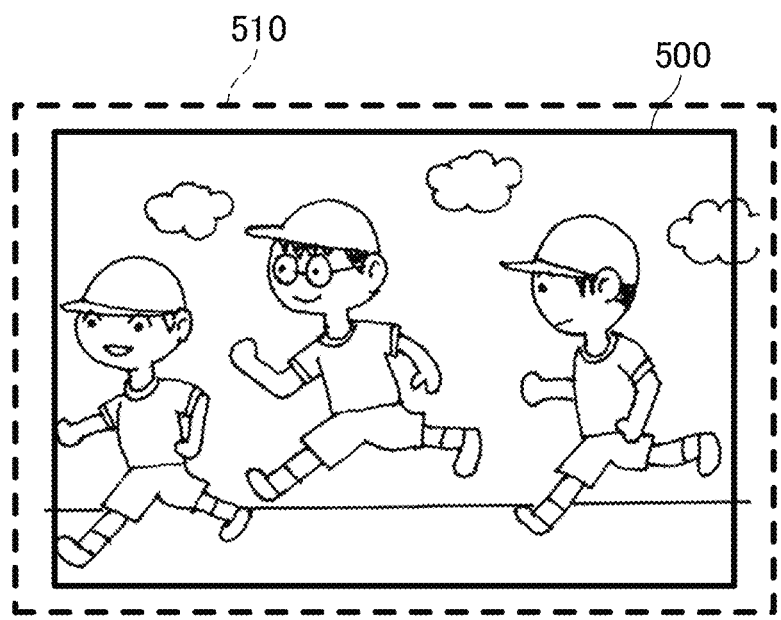
FIGS. 4A and 4B are schematic diagrams illustrating a field frame and an imaging range obtained by the imaging element in a superimposed manner.
Figure 4B:
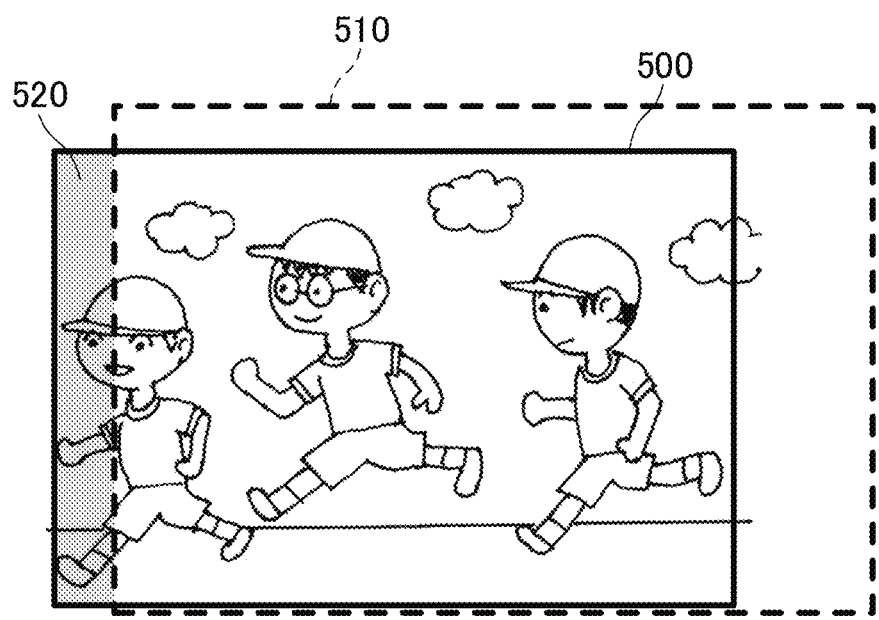

With reference to FIGS. 4A and 4B, the reduction process of the field frame in step S104 in FIG. 3 will be described. FIGS. 4A and 4B are schematic diagrams illustrating the field frame and the imaging range imaged by the imaging element 430 in a superimposed manner. Through the field frame 500, the user can determine the range of the object image that can be observed by looking through the viewfinder. The field frame 500 is electronically displayed on the in-viewfinder information display device 23 configured by, for example, a transparent organic EL panel. In contrast, the range 510 is an imaging range imaged by the imaging element 430. As shown in FIG. 4A, the field frame 500 is slightly smaller than the imaging range 510. This is because the amount of positional deviation in the camera between the field frame 500 and the imaging range 510 is taken into account, and the size of the field frame 500 is reduced by the amount. Consequently, it is possible to contain all the object images observed in the field frame 500 in the imaging range 510. In other words, all the object images that can be observed looking through the viewfinder by the user are reflected as a shot image. In the case where the image shake correction operation is not performed, this state is obtained.

After the ON operation of the second switch SW 2 of the release SW 41 by the user, the image shake correction operation is performed. Hence, the ideal motion is that the imaging element 430 moves so as to cancel camera shake and the like, so the object image observed in the field frame 500 at the timing of the ON operation of the SW 2 is imaged in a state in which the object image is fixed on the imaging plane. However, an error may occur in the calculation of the target position due to a detection error of the shake detection sensor 50, and in addition, and a deviation from the target position may occur due to position detection deviation by the position detection sensor 480. An example of the result is shown in FIG. 4B. FIG. 4B illustrates a state in which the imaging range 510 deviates to the right of the field frame 500 at the timing of the ON operation of the SW 2. In this state, a non-shooting region 520 including an object that is observed in the field frame 500 exists outside the range of the imaging range 510. Specifically, in the example of FIG. 4B, even if the user can observe all the running persons as objects in the field frame 500, the captured image indicates a situation in which half of the leftmost person is not seen in the shot image. The situation in which a part of the object image that can be observed by the user through the viewfinder is not seen in the shot image occurs, in the result being that the user may miss a shooting opportunity.

Accordingly, in the present embodiment, the detection error of the shake detection sensor 50 and the position detection deviation of the position detection sensor 480 are realized in advance. The reduction process of the field frame 500 is executed such that the field frame 500 is not outside the imaging range 510 even if the imaging range 510 deviates from the field frame 500. A specific description will be given with reference to FIGS. 5A and 5B.

Figure 5A:
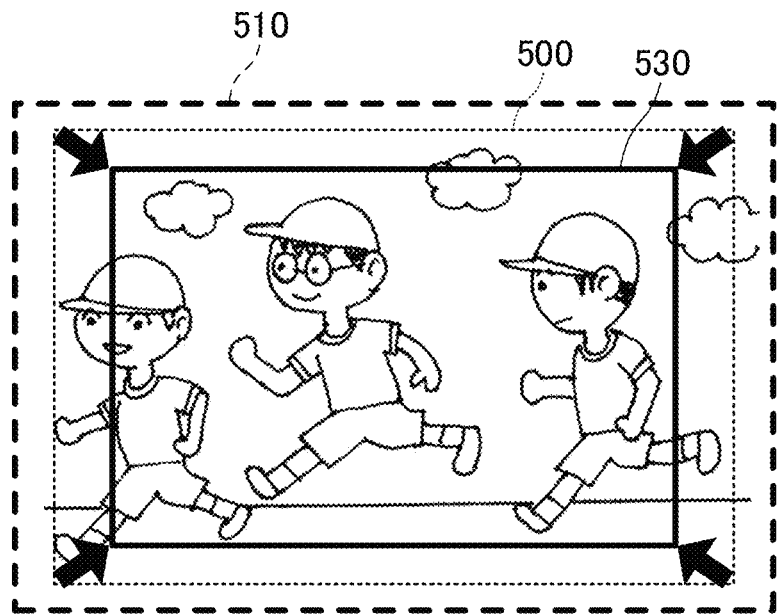
FIGS. 5A and 5B are schematic diagrams illustrating a reduction process of the field frame.

The field frame 530 shown in FIG. 5A shows a field frame that is reduced based on the original field frame 500. Specifically, a new field frame 530 is displayed in which the field frame opening amount is reduced relative to the field frame 500a as a result of taking into account the detection error of the shake detection sensor 50 and the positioning detection deviation of the position detection sensor 480.

Figure 5B:
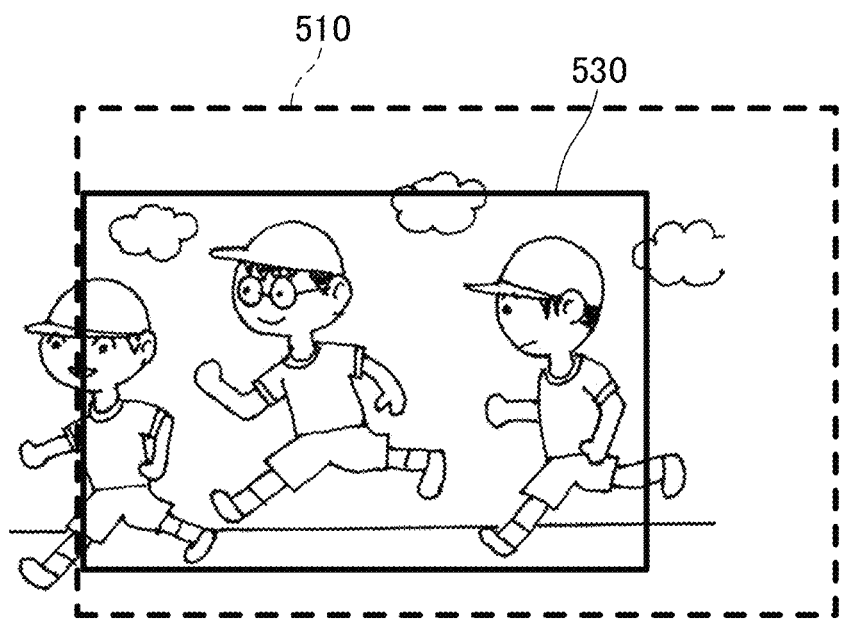

FIG. 5B illustrates an example in which a deviation occurs between the imaging range 510 and the field frame 530 due to the image shake correction operation. FIG. 5B illustrates a state in which the imaging range 510 deviates to the right of the field frame 530 at the timing of the ON operation of the second switch SW 2. However, all the object images observed in the field frame 530 are contained within the imaging range 510. In other words, all the object images that can be observed by the user by looking through the viewfinder are seen as a shot image. The reduction process of the field frame is performed after the ON operation of the first switch SW 1 of the release SW 41. As a result for observing the object image through the viewfinder, the user visually recognizes that half of the person farthest left is not seen in the image as shown in FIG. 5. Thus, the user can change a composition or change an angle of view so that the main object is contained within the field frame 530. The situation in which a part of the object image that can be observed by the user by looking through the viewfinder is not seen in the shot image does not occur, resulting in the user not missing a shooting opportunity.

Details of the reduction process of the field frame shown in step S104 in FIG. 3 will be described with reference to the flowchart in FIG. 6. In step S201, the MPU 101 determines whether or not a shift amount error of the imaging element 430 due to the detection error of the shake detection sensor 50 and the position detection error of a position detection sensor 480 is equal to or larger than a threshold. The shift amount error is a difference between an ideal moving amount of the imaging element 430 for cancelling the angular shake amount due to camera shake and the like and a moving amount of the imaging element 430 that has actually been detected. If the shift amount error is equal to or larger than the threshold, the process proceeds to step S202, and the MPU 101 executes a process that reduces the opening amount of the field frame (hereinafter, also simply referred to as the "frame opening amount"). In contrast, if the shift amount error is less than the threshold, the process proceeds to step S203, and the MPU 101 maintains the initial size of the frame opening amount without reducing it.

One of the factors of the detection error of the shake detection sensor 50 is a vibration in the imaging apparatus, in particular, vibration caused by shock during completion of the travel of the front curtain and the rear curtain that are light shielding members of the shutter unit 32. If the shake detection sensor 50 detects a vibration other than camera shake, an unnecessary component is superimposed on the detection signal, thereby failing to accurately calculate the angular shake amount due to camera shake. Additionally, the magnitude of the vibration differs depending on the shutter driving methods, for example, the mechanical front curtain traveling method and the electronic front curtain traveling method. Accordingly, in the present embodiment, a detection error amount of the shake detection sensor 50 is estimated in advance for each shutter driving method, the MPU 101 calculates the shift amount error of the imaging element 430, and in step S201, and it determines whether the shift amount error or the threshold is larger.

Another factor of the detection error is a motor noise of the AF drive circuit 203 in the interchangeable lens unit 200 mounted on the imaging apparatus. If the motor noise in the interchangeable lens unit 200 caused during driving of the focus lens interferes with or resonates with a vibrator in the shake detection sensor 50, it is impossible to accurately calculate the amount of angular shake due to camera shake. The influence on the shake detection sensor 50 differs depending on the type and the drive frequency of the motor in the interchangeable lens unit 20. In particular, USM noise has a strong influence on the shake detection sensor 50. Accordingly, in the present embodiment, the detection error amount of the shake detection sensor 50 is estimated for each interchangeable lens unit in advance, the MPU 101 calculates the shift amount error of the imaging element 430, and in step S201, it determines whether larger the shift amount error or the threshold is larger.

A factor of the position detection error of the position detection sensor 480 is a linearity deviation caused by nonlinearity of the magnetic flux if the moving amount of the imaging element 430 is large. The position detection sensor 480 detects a change in magnetic flux, in which an unstable region having different magnetic flux densities in the permanent magnet 470 is used if the moving amount of the imaging element 430 is large, which results in the relation between the output of the position detection sensor 480 and the moving amount of the imaging element 430 not becoming a one-to-one linear relation. That is, the actual position of the imaging element deviates from the target position of the imaging element 430. As a countermeasure, there are a method in which an expensive permanent magnet having stable magnetic flux density characteristics is used in a wider region and a method in which a plurality of permanent magnets are combined complicatedly. However, both methods cause cost increases. Hence, in the present embodiment, a linearity deviation amount corresponding to the target position of the imaging element 430, in other words, the position detection error amount of the position detection sensor 480 corresponding to the output value of the shake detection sensor 50 is estimated in advance, and the MPU 101 calculates the shift amount error of the imaging element 430. In step S201, it is determined whether this shift amount error or the threshold is larger.

In step S202 in FIG. 6, as described with reference to FIG. 5A, a process that reduces the opening amount of the field frame is performed. With regards to the reduction amount of the opening of the field frame, there are a first method in which the amount is uniformly set to the fixed value and a second method in which the amount is changed in accordance with a value of the shift amount error of the imaging element 430. In the second method, if the shift amount error is small, the reduction amount of the field frame opening is set small, and if the shift amount error is large, the reduction amount of the field frame opening is set large. Accordingly, it is possible to set the field frame as wide as possible within the range in which all the object images that can be observed by looking through the viewfinder are seen in the shot image. That is, the user can observe the object image within the range as wide as possible.

Figure 6:
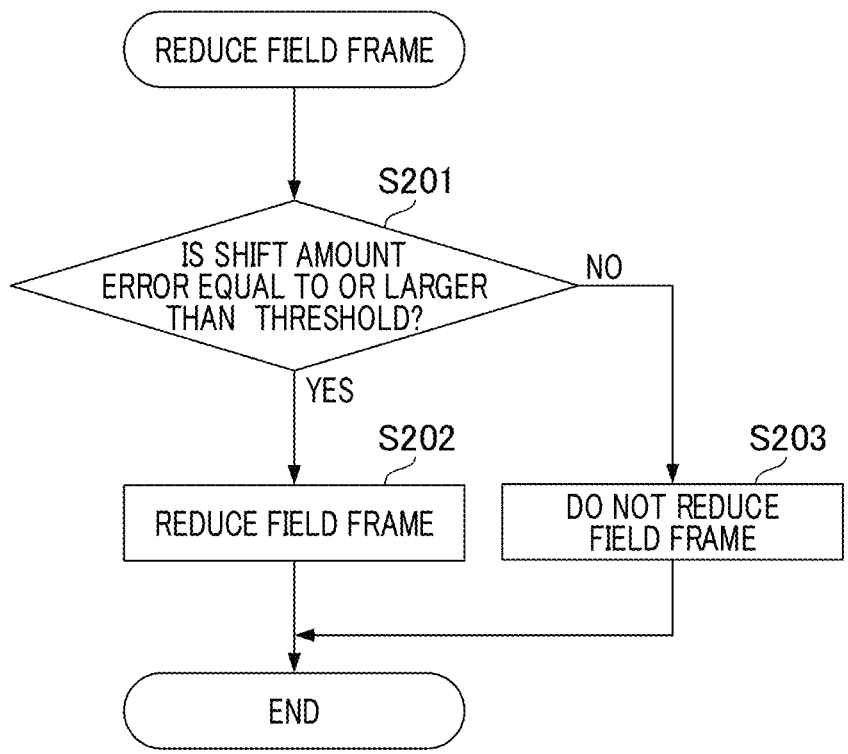
FIG. 6 is a flowchart illustrating the reduction of the field frame in the first embodiment.
Figure 7A:
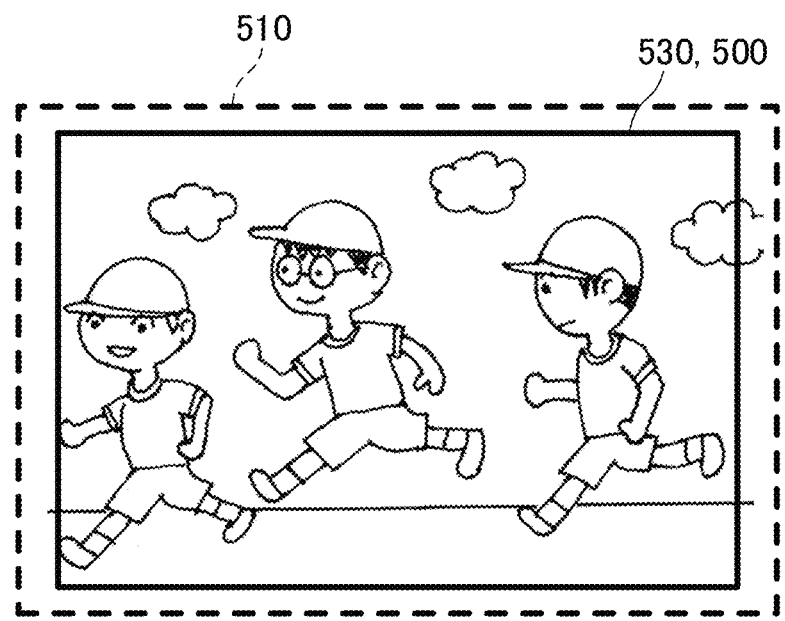
FIGS. 7A and 7B are schematic diagrams illustrating an example in which the field frame is not reduced.

In contrast, in step S203 in FIG. 6, the field frame is not reduced but remains at the initial size. The examples of FIGS. 7A and 7B will be described. FIG. 7A is a schematic diagram that illustrates the field frame and the imaging range captured by the imaging element 430 in a superimposed manner. The field frame 530 is not reduced and remains the size same as the original field frame 500. If the image shake correction operation is performed after the ON operation of the second switch SW 2 of the release SW 41, the shift amount error occurs due to the detection error of the shake detection sensor 50 and the position detection deviation of the position detection sensor 480. An example of the result is shown in FIG. 7B.

Figure 7B:
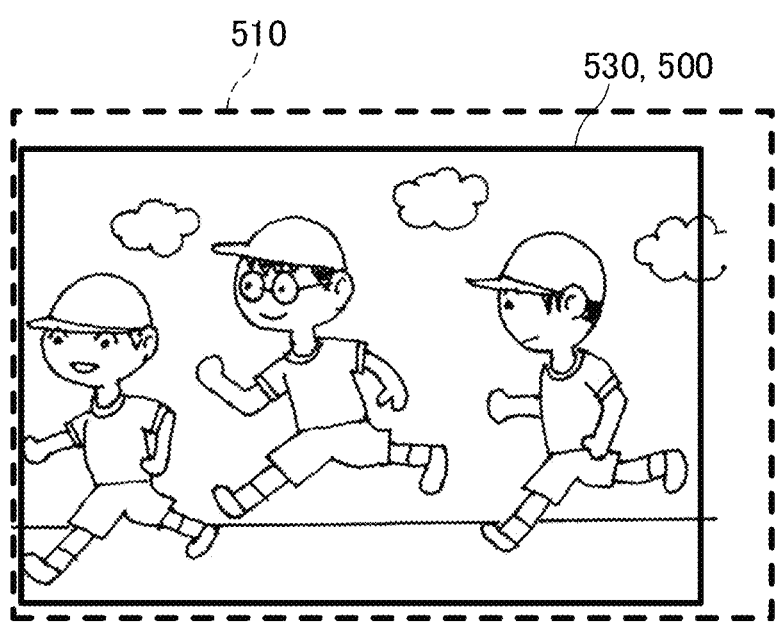

FIG. 7B illustrates a state in which the imaging range 510 deviates to the right of the field frame 530 at the timing of the ON operation of the SW 2. However, all the object images observed in the field frame 530 are contained within the range of the imaging range 510. That is, if the shift amount error is smaller than the threshold, the non-shooting region 520 described with reference to FIG. 4B does not exist. There is no region where an object image observed within the field frame is outside the imaging range. Therefore, even if the frame opening amount is not reduced, the situation in which a part of the object image that can be observed by the user through the viewfinder is not seen in the shot image does not occur, thereby the user does not miss the shooting opportunities.

The threshold used in determining whether the shift amount error or the threshold is larger in step S201 in FIG. 6 is determined based on whether or not the non-shooting region 520 described in FIG. 4B exists. If the shift amount error is less than the threshold, the non-shooting region 520 does not exist.

In the present embodiment, even if the image shake correction mechanism unit moves the imaging element, the viewfinder observation range can be contained in the imaging range. Specifically, it is possible to suppress the situation in which an object that can be observed by the user through the viewfinder is not shot. In particular, if the image shake correction operation is performed after the ON operation of the second switch SW 2 of the release SW 41, there is a case in which the shift amount error of the imaging element 430 due to the detection error of the shake detection sensor 50 and the position detection error of the position detection sensor 480 is large. Even in such a case, it is possible to suppress the situation in which an object that can be observed by the user through the viewfinder is not shot.

Modification of the First Embodiment

Figure 8:
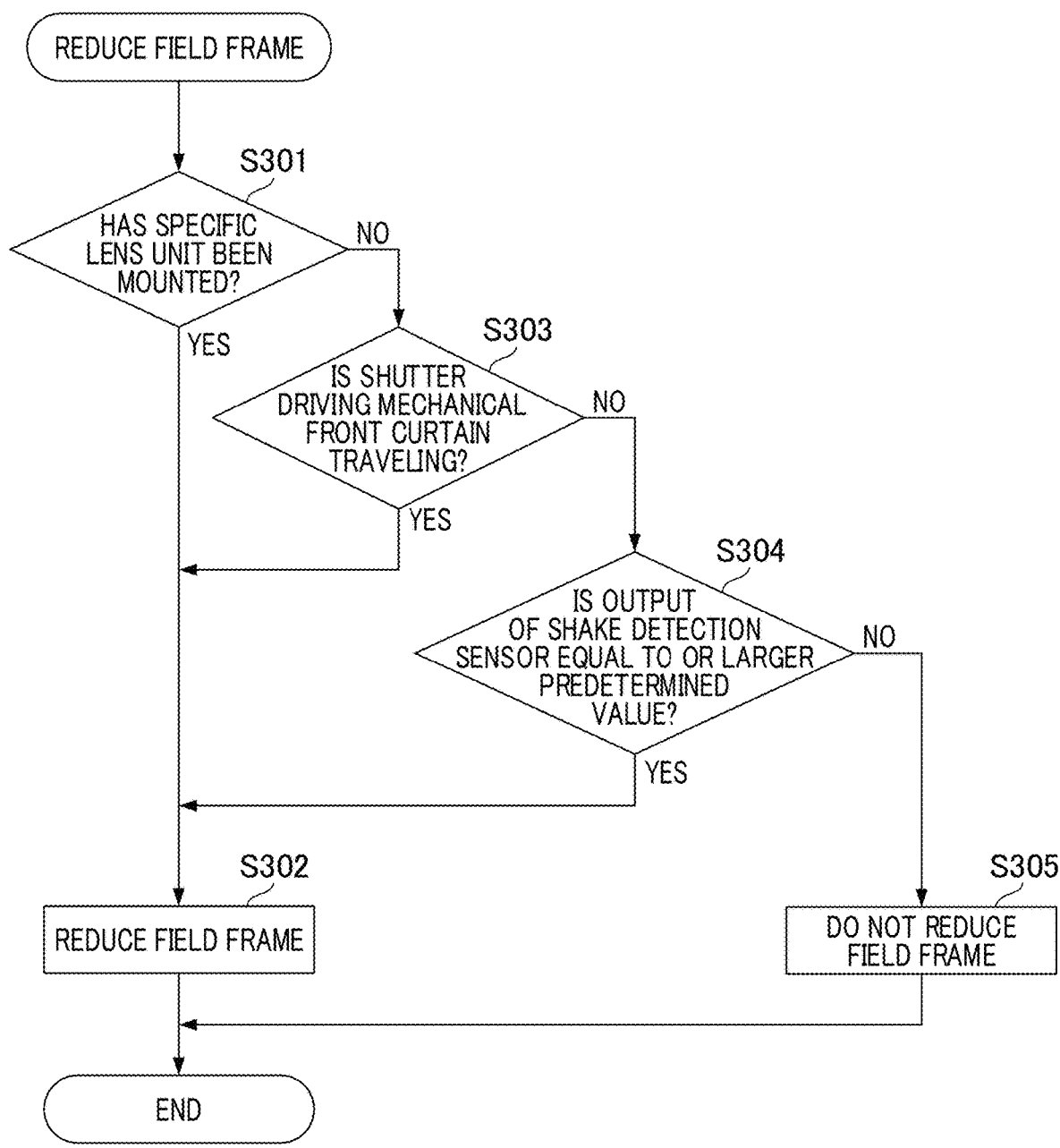
FIG. 8 is a flowchart of the reduction process of the field frame in a modification of the first embodiment.

With reference to the flowchart of FIG. 8, a modified example of the reduction process of the field frame will be described. In step S301, the MPU 101 determines whether or not a specific interchangeable lens unit has been mounted on the digital camera 100. The specific interchangeable lens unit is an interchangeable lens unit in which its motor noise interferes with the vibrator in the shake detection sensor 50 or causes resonance, and thereby may fail to accurately calculate the angular shake amount due to, for example, camera shake. If it is determined that the specific interchangeable lens unit has been mounted, the shift amount error is large, so the process proceeds to step S302. In step S302, the field frame is reduced. In contrast, if it is determined that the specific interchangeable lens unit has not been mounted on the main body of the imaging apparatus, the process proceeds to step S303.

In step S303, the MPU 101 determines whether or not the driving method of the shutter unit 32 is the mechanical front curtain traveling method. In the mechanical front curtain traveling method, a shock vibration during completion of traveling of the front curtain that is a light shielding member, occurs before the exposure operation. If the vibration is detected by the shake detection sensor 50, an unnecessary component is superimposed on the shake detection signal, thereby may it fail to accurately calculate the amount of angular shake due to, for example, camera shake. If it is determined that the shutter drive method is the mechanical front curtain traveling method, the shift amount error is large, so the process proceeds to step S302. If it is determined that the shutter drive method is not the mechanical front curtain traveling method, in other words, the electronic front curtain traveling method is used, the process proceeds to step S304.

In step S304, the MPU 101 determines whether or not the output of the shake detection sensor 50 is equal to or larger than a predetermined threshold. If the output of the shake detection sensor 50 is large, in other words, the imaging element 430 needs to be moved significantly because the shake angle due to, for example, to camera shake is large, linearity deviation of the position detection sensor 480 occurs to cause a position detection error. That is, the actual position of the imaging element may deviate from the target position to which the imaging element 430 moves. Accordingly, if the output of the shake detection sensor 50 is equal to or larger than the threshold, the shift amount error is large and the process proceeds to step S302. In contrast, if the output of the shake detection sensor 50 is less than the threshold, the process proceeds to step S305. In step S305, the MPU 101 maintains the initial size of the frame opening amount without reducing the size thereof.

There is a case in which the shift amount error of the imaging element 430 due to the detection error of the shake detection sensor 50 and the position detection error of the position detection sensor 480 is large if the image shake correction operation has been performed after the ON operation of the SW2 of the release SW 41. Even in such a case, it is possible to shoot all the objects that can be observed through the viewfinder.

The field frame is not limited to the line display, and it may be a semi-transmissive or non-transmissive mask display or an index that shows the observation range of the object image. Additionally, the field frame is not limited to an electronic display frame by using a display device configured by a transparent organic EL panel and the like, and a mechanical display frame may be used. In this case, variable control of the frame opening amount is performed by dividing the frame into a plurality of members, connecting the members by a link mechanism, and moving the frame by an actuator. These matters are the same in the embodiments to be described below.

Second Embodiment

Next, a second embodiment of the present invention will be described. The present embodiment is different from the first embodiment in the start timing of the image shake correction operation. In the first embodiment, the image shake correction operation starts after the SW 2 of the release switch SW 41 becomes ON. In contrast, in the second embodiment, the image shake correction operation starts after the SW 1 of the release switch SW 41 becomes ON. The moving amount of the imaging element due to the image shake correction operation is taken into account and the reduction process of the field frame is performed. In the present embodiment, a difference from the first embodiment will be described, and the same reference numerals as those in the first embodiment will be used for the same elements as those in the first embodiment, and a detailed description thereof will be omitted. The way of omitting such explanation is the same in the embodiment to be described below.

Figure 9:
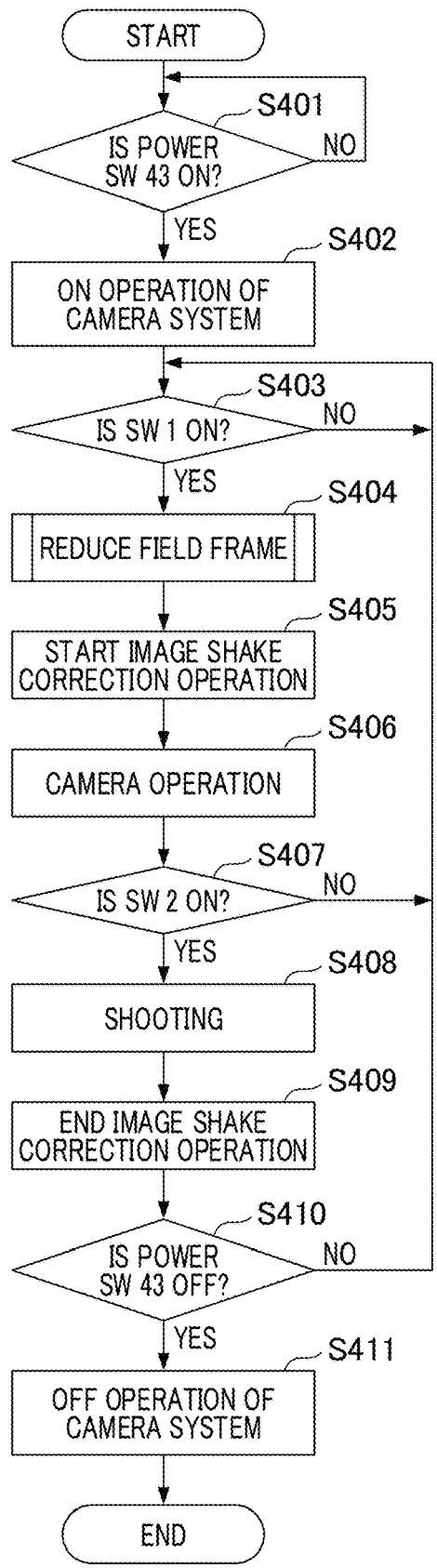
FIG. 9 is a flowchart illustrating an operation of the imaging apparatus according to the second embodiment.

With reference to the flowchart in FIG. 9, the operation in the case where the image shake correction is set to ON in the present embodiment will be described. Since the processes from steps S401 to S403 are the same as those from steps S101 to S103 in FIG. 3 described in the first embodiment, the description thereof will be omitted.

If the ON operation of the SW 1 of the release SW 41 has been detected in step S403, the process proceeds to step S404 to perform the reduction process of the field frame. Based on the control signal from the viewfinder control circuit 108, the in-viewfinder information display device 23 performs a reduced display of the field frame that determines the range of the object image that can be observed by the user in accordance with the amount of the camera shake.

In step S405, the image shake correction operation starts. The image shake correction drive circuit 109 controls energization of the X direction drive coil 460a and the Y direction drive coils 460b and 460c in accordance with the control signal from the MPU 101. The motion control of the imaging element 430 is performed on the camera shake and the like to correct image shake. Since the processes from steps S406 to S411 are the same as those from steps S105, S106, S108 to S111 in FIG. 3 described in the first embodiment, the description thereof will be omitted.

Next, with reference to FIGS. 4A to 5B, the reduction process of the field frame in the present embodiment will be described. Before the image shake correction operation is performed, the state shown in FIG. 4A is assumed. In the present embodiment, the image shake correction operation is performed after the ON operation of the SW 1 of the release SW 41. The motion control of the imaging element 430 is performed so as to cancel camera shake and the like. If the field frame 500 is located at a position fixed to the main body of the imaging apparatus, the range of the object image observed by the user through the viewfinder is also fixed. In the case where a deviation occurs between the field frame 500 and the imaging range 510, the imaging range 510 deviates to the right of the field frame 500, for example, as shown in FIG. 4B. Accordingly, the non-shooting region 520 that includes an object that is observed in the field frame 500 exists outside the range of the imaging range 510.

In the present embodiment, the field frame 500 is reduced such that the field frame 500 is not outside the imaging range 510 even if the imaging range 510 deviates from the field frame 500 based on the output of the shake detection sensor 50. As shown in FIG. 5A, a new field frame 530 is displayed in which frame opening amount is reduced as compared to the original field frame 500. In image shake correction, the target position of the motion of the image element 430 necessary for reducing image shake is calculated based on the angular shake amount from the shake detection sensor 50. At this target position, the field frame 530 is reduced so as to prevent the occurrence of the non-shooting region 520. As shown in FIG. 5B, although the imaging range 510 deviates to the right of the field frame 530, all of the object images observed in the field frame 530 are contained within the imaging range 510. The user observes the object through the viewfinder and visually recognizes that half of the leftmost person is not seen, as shown in FIG. 5A. Accordingly, the user can change a desired composition and an angle of view so as to contain a main object within the field frame 530.

Figure 10:
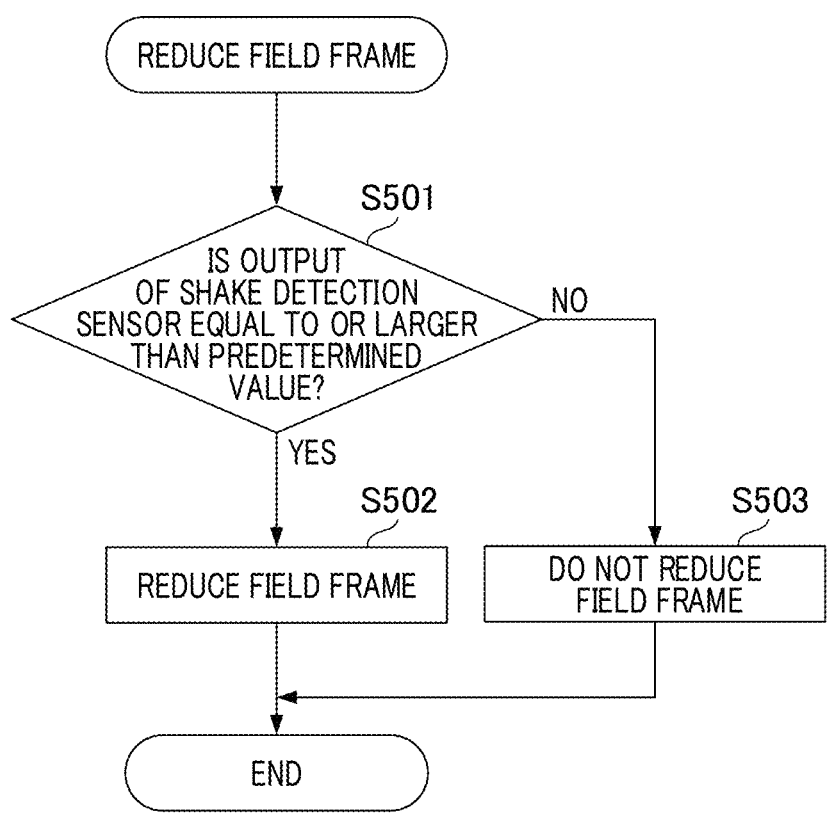
FIG. 10 is a flowchart of the reduction process of the field frame according to the second embodiment.

With reference to the flowchart in FIG. 10, details of the reduction process of the field frame shown in step S404 in FIG. 9 will be described. In step S501, the MPU 101 determines whether or not the output of the shake detection sensor 50 is equal to or larger than a predetermined threshold. If the output of the shake detection sensor 50 is equal to or larger than the threshold, the amount of deviation between the field frame 500 and the imaging range 510 is large, so the process proceeds to step S502. If the output of the shake detection sensor 50 is less than the threshold, the process proceeds to step S503.

In step S502, the MPU 101 executes a process that reduces the frame opening amount. The reduction amount of the field frame opening of the viewfinder is a fixed value or a variable value. If the reduction amount is a variable value, the MPU 101 changes the reduction amount in accordance with the output value of the shake detection sensor 50, in other words, the size of the shake angle. The reduction amount of the field frame opening set in the case of a small shake detection signal is larger than that set in the case of a large shake detection signal. Accordingly, it is possible to set the field frame as wide as possible within the range where all the object images that can be observed by the user through the viewfinder are seen in the shot image. The user can observe the object image in a wider range.

Additionally, in step S503, the MPU 101 maintains the initial size of the frame opening amount without reducing the size thereof. The reason will be described with reference to FIG. 7B as an example. FIG. 7B illustrates a state in which the imaging range 510 deviates to the right of the field frame 530. The object images observed in the field frame 530 are all contained within the imaging range 510. If the output value of the shake detection sensor 50 is small, in other words, if the shake angle due to camera shake and the like is small, the non-shooting region 520 described with reference to FIG. 4B does not exist. Therefore, a situation does not occur in which a part of the object image that can be observed by the user by looking through the viewfinder is not seen in the shot image even without reducing the field frame, and as a result, the user does not miss the shooting opportunities.

According to the present embodiment, it is possible to shoot all the objects that can be observed through the viewfinder even if the output value of the shake detection sensor 50 is large, in other words, even if camera shake and the like are large, in performing the image shake correction operation after the ON operation of the SW 1 of the release SW 41.

Third Embodiment

Next, the third embodiment of the present invention will be described. In the present embodiment, instead of reducing the field frame opening amount of the viewfinder, a process mode that limits a moving amount of the imaging element due to the image shake correction operation is added.

The operation of the present embodiment will be described with reference to the flowchart in FIG. 11. In step S601, the MPU 101 determines whether or not priority is given to a performance that reduces image shake due to camera shake and the like (hereinafter, referred to as "camera shake prevention performance"). The first mode in which priority is given to the camera shake prevention performance is a camera shake prevention performance priority mode, hereinafter, simply referred to as a "performance priority mode". Specifically, if the MPU 101 determines that priority is given to the camera shake prevention performance, the setting of the performance priority mode is performed in step S602. Next, the process proceeds to step S603, and the MPU 101 executes the reduction process of the frame opening amount. The performance priority mode is a mode that maximally reduces the image shake due to camera shake and the like by moving the imaging element. Therefore, the field frame is reduced so as to prevent the occurrence of the non-shooting region 520 (see FIG. 4B).

In contrast, if the MPU 101 determines in step S601 that priority is not given to camera shake prevention performance, in step S604, the MPU 101 sets the viewfinder coverage priority mode that is the second mode. The viewfinder coverage represents the ratio of the viewfinder observation range to the imaging range. The viewfinder coverage priority mode is a mode that moves the imaging element within a range in which the non-shooting region 520 does not occur while maintaining the initial size of the field frame without reducing the size thereof. The specific description will be given with reference to the examples in FIGS. 7A and 7B.

FIG. 7A is a schematic diagram showing the field frame and the imaging range imaged by the imaging element 430 in a superimposed manner. The original size of the field frame 530 is maintained rather reducing the size thereof. It is assumed that the image shake correction operation is performed after the ON operation of the SW 2 of the release SW 41 and a shift amount error occurs due to, for example, a detection error of the shake detection sensor 50. In the viewfinder coverage priority mode, the moving amount of the imaging element 430 is limited without allocating all the amounts of the shift amount error to the motion of the imaging element 430. Specifically, the MPU 101 performs control to move the imaging element 430 within the range in which all of the object images observed in the field frame 530 are contained within the region of the imaging range 510. As a result, as shown in the example of FIG. 7B, the imaging range 510 deviates to the right of the field frame 530 at the timing of the ON operation of the SW 2. However, all the object images observed in the field frame 530 are contained within the imaging range 510.

If the viewfinder coverage priority mode is set, it is possible to maximize the viewfinder coverage. However, since the moving amount of the imaging element 430 is limited, the camera shake prevention performance in the viewfinder coverage priority mode is lower than that in the performance priority mode. For example, although the effect of camera shake prevention for five shutter seconds is obtained in the performance priority mode, only the effect of camera shake prevention for three shutter seconds can be obtained in the viewfinder coverage priority mode.

Depending on the usage of the user and the shooting condition, there are cases in which it is necessary to prioritize the viewfinder coverage rather than the camera shake preventing effect. Specifically, the viewfinder coverage priority mode is greatly effective if it is necessary to prioritize the composition during shooting by substantially matching the imaging range and the viewfinder observation range.

In the present embodiment, it is possible to appropriately select two different modes having different purposes. For example, if the user sets the image shake correction operation to ON by the image shake correction setting SW 42 before shooting, the performance priority mode or the viewfinder coverage priority mode can be selected in advance. Alternatively, the mode is automatically switched in accordance with the selected shooting mode if the user operates the shooting mode setting dial 44. For example, if an "Auto (automatic setting) mode" is selected, the performance priority mode is automatically selected. This is because, in a camera-based shooting mode, it is desirable that the shot image is an image having as little as possible image blur even if the user does not take into consideration the influence of camera shake much during shooting. In contrast, if an "M (manual exposure) mode" is selected, the viewfinder coverage priority mode is automatically selected. This is because it is desirable to maximize the viewfinder coverage even in a case in which the camera shake prevention performance is lowered since it is assumed that the user who chooses the M mode prioritizes the shooting condition, in other words, prioritizes the composition during shooting.

Additionally, the mode may be switched automatically in accordance with the type of the lens device mounted on the main body of the imaging apparatus. For example, if it is detected that a telephoto lens having a focal length equal to or larger than a threshold has been mounted on the main body of the imaging apparatus, the MPU 101 automatically selects the viewfinder coverage priority mode. This is because, in a lens device having a long focal length, it is impossible to obtain the effect of reducing image shake due, for example, to camera shake sufficiently even if the imaging element is significantly moved. That is, it is impossible to obtain a sufficient effect of camera shake prevention even if the field frame is reduced to increase the moving amount of the imaging element. In that case, it is more advantageous for practical use to maximize the viewfinder coverage without changing the size of the field frame rather than reducing the field frame. In contrast, if it is detected that a wide-angle lens having a focal length that is less than the threshold has been mounted on the main body of the imaging apparatus, the MPU 101 automatically selects the performance priority mode. This is because it is desirable to maximize the moving amount of the imaging element by reducing the field frame since a lens device having a short focal length has a significant effect for preventing camera shake caused by moving the imaging element.

In the present embodiment, in a manner similar to the first embodiment, an example in which the image shake correction operation starts after the SW 2 of the release SW 41 becomes ON has been described. In a manner similar to the second embodiment, the same effect can be obtained if the image shake correction operation starts after the SW 1 of the release SW 41 becomes ON. The process in that case is similar to that shown in the flowchart in FIG. 9. If the user performs the ON operation of the SW 1 of the release SW 41, the reduction process of the field frame is performed. The reduction process of the field frame is similar to the process shown in the flowchart in FIG. 11. An example in which the viewfinder coverage priority mode is set in step S604 will be described with reference to FIGS. 7A and 7B.

In FIG. 7A, the field frame 530 is not reduced in the viewfinder coverage priority mode and maintains the size same as the original field frame 500. The image shake correction operation is performed after the ON operation of the SW 1 of the release SW 41. The motion control of the imaging element 430 is performed in accordance with the size of the shake angle due to camera shake corresponding to the output of the shake detection sensor 50, in which the MPU 101 limits the moving amount of the imaging element 430. The imaging element 430 moves within a range in which all the object images observed in the field frame 530 are contained within the region of the imaging range 510. As a result, as shown in FIG. 7B, although the imaging range 510 deviates to the right of the field frame 530, all the object images observed in the field frame 530 are contained within the imaging range 510.

In the present embodiment, the performance priority mode and the viewfinder coverage priority mode are provided, and as a result, it is possible to respond to the demands of both users who want to give priority to camera shake prevention and who want to give priority to a viewfinder coverage while performing the image shake correction.

The scope of the following claims is to be accorded the broadest interpretation so as to encompass all such modifications and equivalent structures and functions.

This application claims the benefit of Japanese Patent Application No. 2018-013252, filed Jan. 30, 2018 which is hereby incorporated by reference in its entirety.

What is claimed is:

1. An imaging apparatus including an imaging element that images an object through an imaging optical system comprising:
    at least one processor and at least one memory functioning as:
        a driving unit configured to drive the imaging element in a direction orthogonal to the optical axis of the imaging optical system;
        a correction unit configured to correct image blur of an image captured by the imaging element by calculating a moving amount of the imaging element based on a shake detection signal from a shake detection unit and controlling the drive unit; and
        a control unit configured to perform control to change an opening amount of a field frame of a viewfinder used in observation the object,
    wherein the control unit performs control to reduce the field frame in a case where the image shake correction is performed so as to be smaller than the field frame in a case where the image shake correction is not performed.

2. The imaging apparatus according to claim 1 further comprising:
    a movable member configured to hold the imaging element;
    a fixing member configured to support the movable member;
    a driver configured to move the movable member in a direction orthogonal to the optical axis of the imaging optical system or rotate the movable member about an axis parallel to the optical axis of the imaging optical system; and
    a position detector configured to detect a position of the movable member,
    wherein the correction unit controls the driver by using the shake detection signal and a position detection signal from the position detection unit, and performs image shake correction by controlling the motion or the rotation of the movable member.

3. The imaging apparatus according to claim 2,
    wherein, in performing the image shake correction, if a difference between a target moving amount of the imaging element and a moving amount of the imaging element based on the detected position by the position detection unit is equal to or more than a threshold, the control unit performs control to reduce an opening amount of the field frame, and if the difference between the target moving amount of the imaging element and the moving amount of the imaging element based on the detected position by the position detection unit is less than the threshold, the control unit does not perform control to reduce the opening amount of the field frame.

4. The imaging apparatus according to claim 3,
    wherein the control unit increases the reduction amount of the opening of the field frame that is set if the difference is larger than the reduction amount of the opening of the field frame that is set if the difference is small.

5. The imaging apparatus according to claim 1,
    wherein if a lens device is mounted on a main body of the imaging apparatus, the control unit determines the lens device to determine whether or not to change the opening amount of the field frame.

6. The imaging apparatus according to claim 1 further comprising:
    a shutter unit configured to control an exposure time of the imaging element by the travel of the front curtain and the rear curtain that are light shielding members,
    wherein if an exposure operation of the imaging element is performed by the travel of the front curtain and the rear curtain, the control unit performs control to reduce the opening amount of the field frame.

7. The imaging apparatus according to claim 1,
    wherein the control unit performs control to reduce the opening amount of the field frame if the shake detection signal is equal to or more than a threshold, and the control unit does not perform control to reduce the opening amount of the field frame if the shake detection signal is less than the threshold.

8. The imaging apparatus according to claim 1,
    wherein the control unit increases the reduction amount of the opening of the field frame that is set if the shake detection signal is larger than the reduction amount of the opening of the field frame that is set if the shake detection signal is small.

9. The imaging apparatus according to claim 1, further comprising:
    an operation unit configured to have first and second switches being operated in stages and instruct the imaging apparatus to start shooting,
    wherein the control unit performs control to set the opening amount of the field frame after the operation of the first switch is detected.

10. The imaging apparatus according to claim 9,
wherein, in performing the image shake correction, the control unit performs control to set the opening amount of the field frame and starts the operation of the image shake correction.

11. The imaging apparatus according to claim 1,
wherein, in performing the image shake correction, the control unit has a first mode that prioritizes a performance of the image shake correction and a second mode that prioritizes a viewfinder coverage pertaining to the viewfinder, in which, in the first mode, the control unit performs control to reduce the opening amount of the field frame, and, in the second mode, the control unit does not perform control to reduce the opening amount of the field frame.

12. The imaging apparatus according to claim 11,
wherein the control unit limits a moving amount of the imaging element in the second mode.

13. The imaging apparatus according to claim 11, further comprising:
a setting unit configured to set a shooting mode of the imaging apparatus,
wherein the control unit selects the first or second mode depending on shooting modes set by the setting unit.

14. The imaging apparatus according to claim 13,
wherein the control unit selects the first mode if an automatic setting shooting mode is set by the setting unit and selects the second mode if a manual exposure shooting mode is set by the setting unit.

15. The imaging apparatus according to claim 11,
wherein the control unit identifies the lens device mounted on the main body of the imaging apparatus to select the first or second mode.

16. The imaging device according to claim 15,
wherein the control unit selects the first mode if a focal length of the lens device is less than a threshold and selects the second mode if the focal length of the lens device is equal to or more than the threshold.

17. A control method executed in an imaging apparatus including an imaging element that images an object through an imaging optical system and a drive unit that drives the imaging element in a direction orthogonal to the optical axis of the imaging optical system comprising:
performing control to correct an image blur of an image captured by the imaging element by calculating a moving amount of the imaging element by a control unit based on a shake detection signal from a shake detection unit and controlling the drive unit; and
performing control to change an opening amount of a field frame of a viewfinder used in observation of the object,
wherein, in performing control to change the opening amount of the field frame, the control is performed to reduce the field frame in a case where the image shake correction is performed so as to be smaller than the field frame in a case where the image shake correction is not performed.

* * * * *